Figure 1:
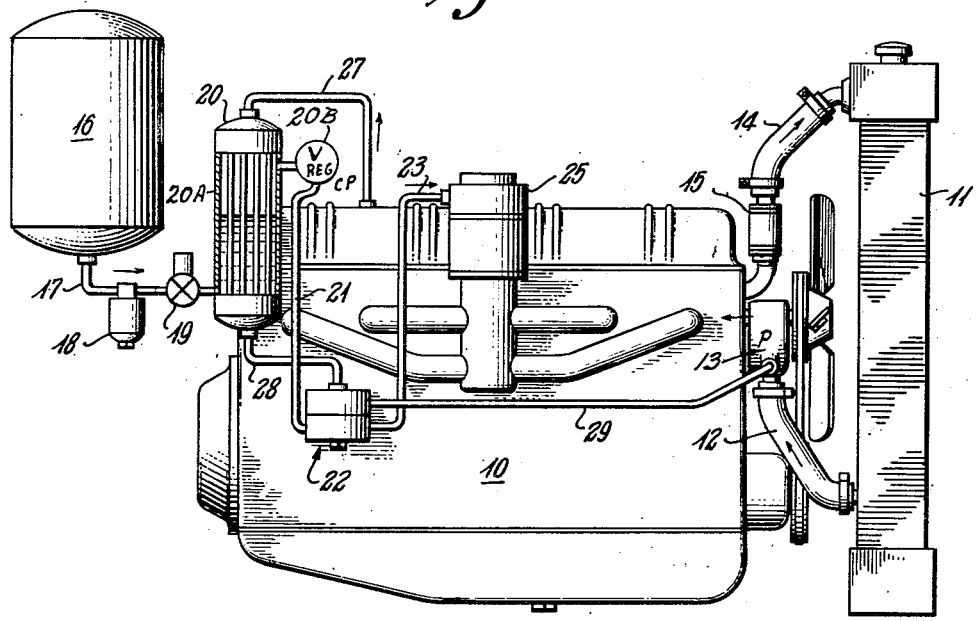

April 16, 1957

R. A. MENGELKAMP ET AL 2,788,779

LIQUEFIED PETROLEUM GAS SYSTEM

Filed Dec. 14, 1953

INVENTORS
R. A. Mengelkamp &
W. C. Mitchell
BY
Hudson & Young
ATTORNEYS

United States Patent Office 2,788,779
Patented Apr. 16, 1957

2,788,779

LIQUEFIED PETROLEUM GAS SYSTEM

Richard Arthur Mengelkamp and Wilbur C. Mitchell, Bartlesville, Okla., assignors to Phillips Petroleum Company, a corporation of Delaware Application December 14, 1953, Serial No. 398,075

5 Claims. (Cl. 123—122)

This invention relates to apparatus for vaporizing liquefied petroleum gases. In another aspect it relates to thermostats wherein the temperature of a first fluid stream controls the flow of a second fluid stream.

Liquefied petroleum gases such as butane, propane and the like have recently been employed as fuels for internal combustion engines. Because these fuels are volatile at normal atmospheric temperatures, they are handled and shipped in containers which are maintained under sufficient pressure to keep the fuel in a liquid state. In use, this fuel is vaporized before being supplied to the engine. However, numerous difficulties have been encountered in employing these fuels in internal combustion engines because of their extreme volatility and the resulting cooling effect produced when the liquid expands into a vapor. To overcome this difficulty converters have been provided to control the vaporization of the liquid fuel. A heating medium is circulated through the converter to counteract tthe cooling effect resulting from the vaporization. In liquid cooled engines this heating medium can be the coolant circulated through the engine and radiator.

One difficulty that has resulted from the use of such a converter is that the temperature of the vaporized fuel often becomes elevated to a value approaching the temperature of the engine coolant. In automobile engines the temperature of such vaporized fuel supplied to the carburetor may be as high as 140° F. By lowering the temperature of this vaporized fuel, the volumetric efficiency of the engine is increased. Furthermore, knocking in the engine is reduced by supplying fuel to the engine at lower temperatures. In addition, the air-fuel ratio is maintained constant.

In accordance with the present invention a thermostat is positioned in the line delivering the vaporized fuel to the engine carburetor. This themostat operates to control the flow of heating medium to the converter to regulate the quantity of heat supplied thereto. In this manner the temperature of the vaporized fuel supplied to the engine can be controlled in an accurate manner, and the temperature of this vaporized fuel can be maintained at a considerably lower value than normally would result in the absence of such a control system. The thermostat employed for this control operation preferably is in the form of a housing having a diaphragm to divide the housing into two chambers. The vaporized fuel is passed through the first chamber which contains an expansible bellows. This bellows is connected through the diaphragm to a valve which controls the flow of heating medium through the second chamber.

Accordingly, it is an object of this invention to provide an improved system for vaporizing liquefied petroleum gases.

Another object is to control the heat supplied to a liquefied petroleum gas converter in response to the temperature of the vapor supplied by the converter.

Another object is to provide control apparatus for use with an internal combustion engine whereby vaporized fuel can be supplied to the engine at a predetermined temperature.

A further object is to provide a thermostat wherein the rate of flow of a first fluid stream is controlled by the temperature of a second fluid stream.

Figure 2:
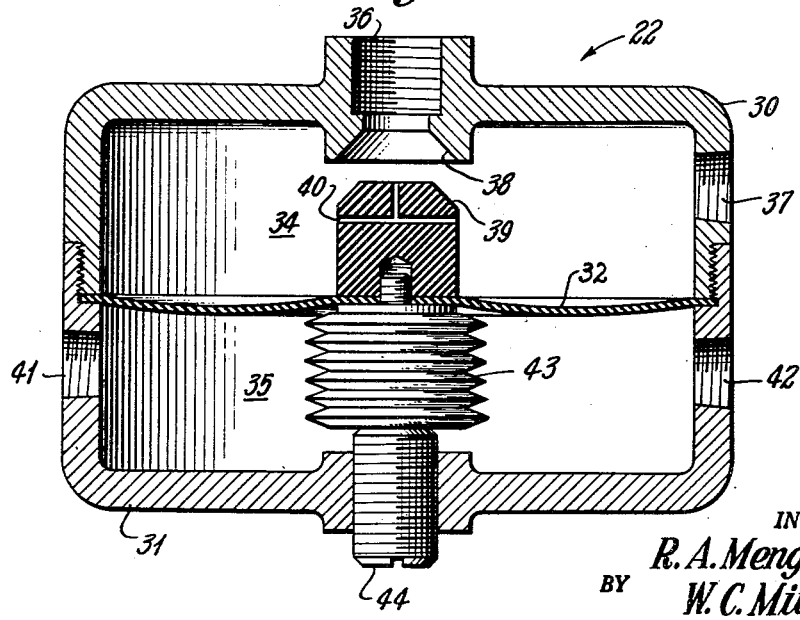

Various other objects, advantages and features of this invention should become apparent from the following detailed description taken in conjunction with the accompanying drawing in which:

Figure 1 is a schematic representation of the temperature control apparatus of this invention employed in conjunction with an internal combustion engine operated by liquefied petroleum gas; and Figure 2 is a schematic representation of the thermostat employed in the control system of Figure 1.

Referring now to the drawing in detail and to Figure 1 in particular, there is shown a liquid cooled internal combustion engine 10. Coolant is circulated from a radiator 11 through a conduit 12 and a pump 13 to engine 10. From engine 10 the coolant passes through a conduit 14 having a thermostat 15 therein back to radiator 11. Fuel for engine 10 is supplied from a tank 16 which contains liquefied petroleum gas. This liquid fuel is passed through a conduit 17 having a filter 18 and a valve 19 therein to a converter generally designated as 20. This converter is any converter known to the prior art. All converters comprise the combination of a heat exchanger 20A with a constant pressure regulating valve 20B to reduce the pressure in the vapor outlet line 21 of the heat exchanger to a constant pressure suitable for uniform operation of carburetor 25, because the vapor pressure in heat exchanger 20A is too high, and varies too much with temperature changes, to be used directly in carburetor 25. From converter 20 the resulting vaporized fuel is passed through a conduit 21 to a first chamber in a thermostat 22, and thence through a conduit 23 to the carburetor 25 of engine 10. A conduit 27 communicates between engine 10 and converter 20, and a conduit 28 communicates between converter 20 and the second chamber of thermostat 22. A return conduit 29 is connected between this second chamber of thermostat 22 and the inlet of pump 13. In this manner a portion of the heated engine coolant by-passes radiator 11 and is circulated through converter 20 to supply heat for the vaporization of the liquid fuel. Converter 20 can be any convenient type of apparatus readily available wherein a heating medium is circulated in heat exchange relationship with the liquid fuel to be vaporized.

In Figure 2, thermostat 22 is illustrated in detail. This thermostat comprises a first annular housing member 30 to which is threaded a second annular housing member 31. A flexible diaphragm 32, which can be constructed of neoprene or other synthetic material, for example, is fitted into a recess between housings 30 and 31 to divide the assembled apparatus into first and second chambers 34 and 35. Housing 30 is provided with an inlet opening 36 which is adapted to receive conduit 28 and with a second opening 37 which is adapted to receive conduit 29. The portion of housing 30 adjacent opening 36 forms a valve seat 38 which receives a valve head 39. Valve head 39, which preferably is constructed of neoprene or other synthetic material, is either attached to diaphragm 32 or forms an integral part thereof. If desired, valve head 39 can be provided with a bleed passage 40 such that when valve head 39 is in a fully closed position on valve seat 38 a small passage is provided between openings 36 and 37.

Housing 31 is provided with a first opening 41 which is adapted to receive conduit 21 and with a second opening 42 which is adapted to receive conduit 23. An expansible bellows 43 is positioned within chamber 35 between diaphragm 32 and an adjusting plug 44 which is threaded in housing 31. Bellows 43 is filled with a fluid which can be either a gas or a liquid which becomes vaporized at a predetermined temperature in the general range of the temperature desired to be maintained by the thermostat.

In operation, valve 19 is opened to pass liquid fuel from tank 16 into converter 20. As soon as the pressure on this liquid fuel is released, the fuel is vaporized and passes through conduit 21, chamber 35 of thermostat 22, and conduit 23 to the carburetor 25 of engine 10. This vapor initially is relatively cool such that bellows 43 remains contracted and valve head 39 remains off valve seat 38 whereby the engine coolant passes freely through chamber 34 and converter 20. As the engine becomes warmer, this coolant becomes elevated in temperature until it reaches the desired engine operating temperature which can be of the order of 180° F., for example, in an automobile engine. The free circulation of this heated coolant through converter 20 results in the vapor passing through chamber 35 of thermostat 22 being elevated to a temperature sufficient to close or partially close the valve in chamber 34. This results in less coolant being supplied to converter 20 whereby the temperature of the vaporized fuel supplied to engine 10 is maintained at a desired value which can be in the general range of 30° F. to 40° F., for example. The particular temperature at which this vapor is supplied to the engine can readily be adjusted by means of adjusting plug 44 which increases or decreases the initial clearance of valve head 39 and valve seat 38.

From the foregoing description of a preferred embodiment of this invention it should be apparent that several decided advantages are provided by this control system. By controlling the amount of engine coolant supplied to converter 20, the temperature of the vaporized fuel can be maintained at a predetermined value. It should be noted that the engine coolant supplied to converter 20 actually serves as a heating medium for the converter to counteract the cooling effect resulting from the expansion of the liquid fuel. By controlling this flow of coolant in direct response to temperature of the vaporized fuel it is possible to maintain a close control over the temperature of the vaporized fuel.

Diaphragm 32 of thermostat preferably is made sufficiently thick to function as an insulating body to prevent the vaporized fuel passing through chamber 35 from becoming warmed excessively by the coolant in chamber 34. If desired, housings 30 and 31 can be provided with heat insulation sectors, not shown, or can even be made entirely of heat insulating material to reduce the heat transfer between the fluids in chambers 34 and 35. Although preferably constructed of neoprene or other flexible material, valve head 39 can be formed of any desired material including metals. Furthermore, passage 40 can be any desired size or can be eliminated entirely depending upon the particular desired rate of flow of engine coolant through chamber 34. Obviously, opening 37 of housing 30 can be the inlet opening and opening 36 can be the outlet opening if desired.

Thus, while the invention has been described in conjunction with a present preferred embodiment, it should be apparent that the invention is not limited thereto.

What is claimed is:

1. A liquid fuel vaporization system for a liquid cooled internal combustion engine, said internal combustion engine having a fuel intake, a liquid cooling jacket in indirect heat exchange with said engine, a radiator, two conduits each connecting a separate point in said liquid jacket with said radiator, and a pump in one of said conduits disposed to circulate a liquid heat transfer medium in a closed cycle through said jacket, radiator and connecting conduits, comprising in combination a liquid fuel tank, a vaporizer, a liquid withdrawal conduit connecting said tank and said vaporizer, a vapor transfer conduit connecting an upper portion of said vaporizer and said fuel intake, a by-pass conduit connected across said pump, said by-pass conduit passing in indirect heat exchange with said vaporizer, a valve in said by-pass conduit, and a motor responsive to the temperature in said vapor transfer conduit disposed to operate said valve to regulate the flow of said heat transfer medium in said by-pass conduit so as to tend to maintain the vapor going to said fuel intake at an approximately constant temperature.

2. In the combination of claim 1, a second by-pass conduit of smaller flow capacity than said first by-pass conduit connected across said valve and thereby disposed to pass a limited minimum amount of said medium through said first by-pass conduit at all times.

3. The combination of claim 1 in which there is a first regulating valve in said liquid withdrawal conduit and a second regulating valve in said vapor transfer conduit, each regulating valve being connected to maintain a constant pressure downstream thereof.

4. A liquid fuel vaporization system for a liquid cooled internal combustion engine, said internal combustion engine having a fuel intake, a liquid cooling jacket in indirect heat exchange with said engine, a radiator, two conduits each connecting a separate point in said liquid jacket with said radiator, and a pump in one of said conduits disposed to circulate a liquid heat transfer medium in a closed cycle through said jacket, radiator and connecting conduits, comprising in combination a liquid fuel tank, a vaporizer, a liquid withdrawal conduit connecting said tank and said vaporizer, a vapor transfer conduit connecting an upper portion of said vaporizer and said fuel intake, a by-pass conduit connected across said pump, said by-pass conduit passing in indirect heat exchange with said vaporized, a thermostatic valve for controlling the rate of flow of said liquid heat transfer medium in said by-pass conduit in response to the temperature of the vapor passing through said vapor conduit, without the possibility of leakage of one fluid into the other, or into the atmosphere, comprising a body having a cavity divided into a first chamber and a second chamber by a leak proof flexible diaphragm, said first chamber forming an intermediate portion of said by-pass conduit and connected thereinto by an inlet and an outlet connection, said second chamber forming an intermediate portion of said vapor conduit and connected thereinto by an inlet connection and an outlet connection, a valve disposed to control flow of said liquid heat transfer medium through one of said connections of said first chamber comprising a valve seat on said connection and a valve head disposed to move with said diaphragm in said first chamber, and an expansible closed temperature-expansible bellows containing a third fluid disposed in said second chamber between said diaphragm and the wall of said second chamber to move said diaphragm and said valve head to control the flow of said liquid heat transfer medium in response to changes in the temperature of said vapor passing through said second chamber.

5. A thermostatic valve for controlling the rate of flow of a first fluid in a first conduit in response to changes in the temperature of a second fluid passing through a second conduit, without the possibility of leakage of one of said fluids into the other of said fluids, or into the atmosphere, comprising in combination a body having a cavity divided into a first chamber and a second chamber by a leak proof flexible diaphragm, said first chamber forming an intermediate portion of said first conduit and connected thereinto by an inlet connection and an outlet connection, said second chamber forming an intermediate portion of said second conduit and connected thereinto by an inlet connection and an outlet connection, a valve disposed to control flow of said first fluid through one of said connections of said first chamber comprising a valve seat on said connection and a valve head disposed to move with said diaphragm in said first chamber, and an expansible closed temperature-expansible bellows containing a third fluid disposed in said second chamber between said diaphragm and the wall of said second chamber to move said diaphragm and said valve head to control the flow of said first fluid in response to changes in the temperature of said second fluid passing through said second chamber.

References Cited in the file of this patent

UNITED STATES PATENTS

| | | |
|---|---|---|
| 1,882,750 | Black | Oct. 18, 1932 |
| 2,255,747 | Jones | Sept. 16, 1941 |
| 2,315,881 | Thomas | Apr. 6, 1943 |
| 2,329,750 | Faucher | Sept. 21, 1943 |
| 2,475,556 | Seligman et al. | July 5, 1949 |
| 2,495,226 | Crago | Jan. 24, 1950 |
| 2,516,218 | Kerr | July 25, 1950 |
| 2,520,191 | Augey et al. | Aug. 29, 1950 |
| 2,618,935 | Malir | Nov. 25, 1952 |